No. 707,581. Patented Aug. 26, 1902.
G. GREGORY.
BRAKE VALVE.
(Application filed Apr. 25, 1902.)
(No Model.) 2 Sheets—Sheet 1.
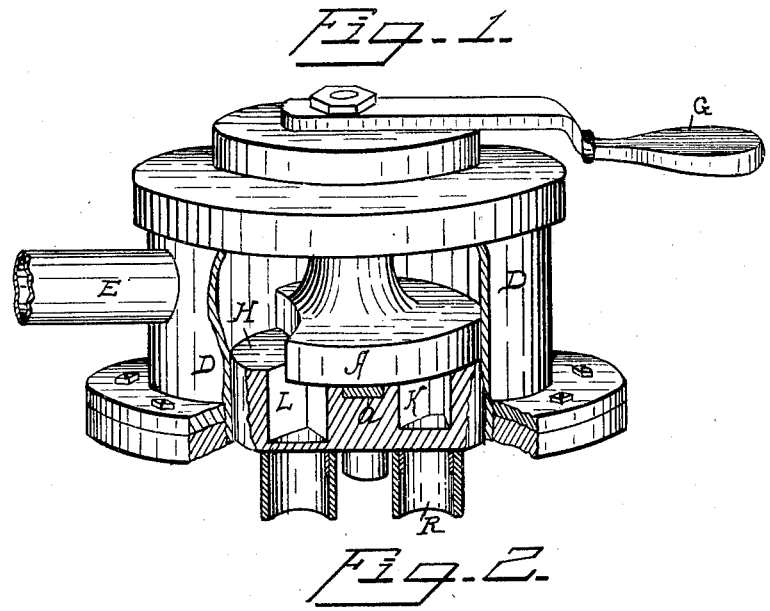
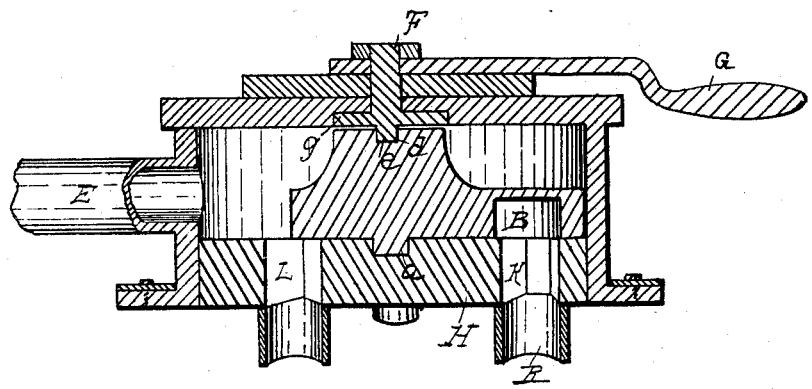
WITNESSES
INVENTOR.
George Gregory
BY M. M. Cady
ATTORNEY.

No. 707,581. Patented Aug. 26, 1902.
G. GREGORY.
BRAKE VALVE.
(Application filed Apr. 25, 1902.)
(No Model.) 2 Sheets—Sheet 2.
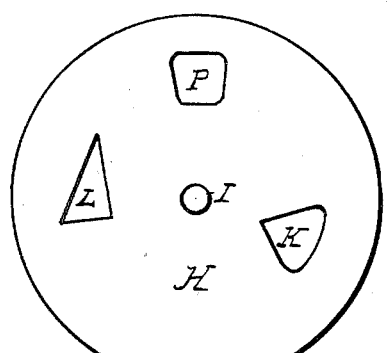
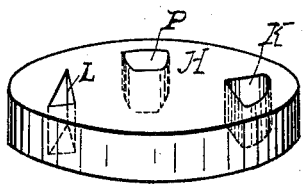
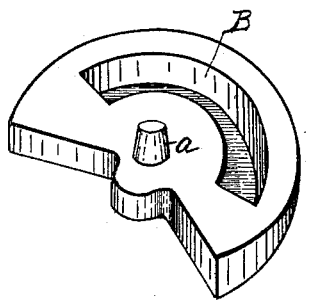
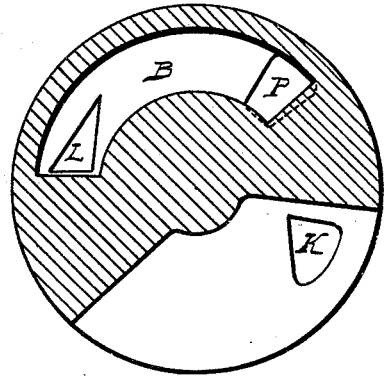
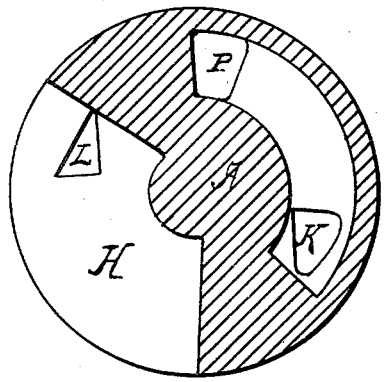
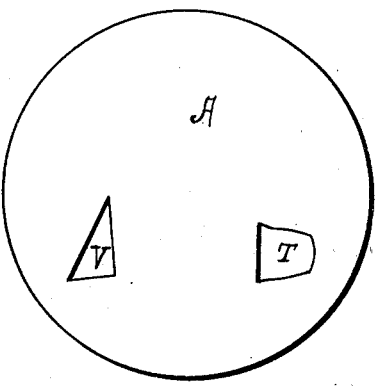
WITNESSES:
Charles H Reynolds
W. B. Keogh
INVENTOR.
George Gregory
BY
M. M. Cady
ATTORNEY.

UNITED STATES PATENT OFFICE.

GEORGE GREGORY, OF OELWEIN, IOWA.

BRAKE-VALVE.

SPECIFICATION forming part of Letters Patent No. 707,581, dated August 26, 1902.

Application filed April 25, 1902. Serial No. 104,602. (No model.)

*To all whom it may concern:*

Be it known that I, GEORGE GREGORY, a citizen of the United States, residing at Oelwein, in the county of Fayette and State of Iowa, (post-office address Box 387,) have invented certain new and useful Improvements in Brake-Valves; and I do hereby declare the following to be a full, clear, and exact description of the invention, which will enable others skilled in the art to which it appertains to make and use the same.

My invention relates to rotary valves, with special reference to those used in operating the automatic air-brakes on railroad-trains known as the "air-brake system," in which by reducing the air-pressure in the train-pipe the brakes are automatically applied and by increasing the pressure in the train-pipe the brakes are released; and it further relates to the operation of the brakes for the tender and engine, which are applied by air-pressure direct and opposite to the mode of operating the automatic air-brake system.

One of the objects is to do away with a multiplicity of valves for operating the automatic brake and also the tender and engine brake, and provide a single rotary valve to be attached to the locomotive-engine whereby the same valve with one lever will simultaneously operate the tender and engine brakes with air direct from the valve and at the same time reduce the pressure on the train-pipe, and thus automatically set the train-brake simultaneously with setting the brake upon the tender and engine, and, further, by reversing the valve to release simultaneously both the automatic brakes on the train service and also the brakes on the tender and engine, whereby one valve will control at the same time by the same lever without any additional assistance both the automatic train-brakes and the engine and tender brakes. These and other objects I accomplish by mounting in a suitable casing a rotary valve which is provided with an air-chamber on its under side and placed upon a valve-seat having three ports, through one of which the air for operating the brakes on the tender and engine is delivered directly from the valve to the brake-cylinder, through another port the air-pressure is released, whereby the automatic train-brake for each car is applied, and through a third port the exhaust into the open air.

The following specification will fully explain the details of the construction of my invention and its mode of operating when read in connection with the accompanying drawings, forming a part hereof, and in which—

Figure 1 is a perspective of the valve and casing with part of the casing cut away and showing the position of the valve therein. Fig. 2 is a vertical section of Fig. 1. Fig. 3 is a perspective of the valve-seat. Fig. 4 is a plan view of the valve-seat. Fig. 5 is a perspective view of the under side of the valve, showing the air-chamber therein. Fig. 6 shows a horizontal section through the valve and a plan view of the same with the valve in position on the seat when the brakes on the tender and engine and the train-brakes are applied. Fig. 7 shows the same view as Fig. 6 when the brakes of the tender and engine and train-brakes are released, and Fig. 8 shows a modified form of valve.

Like letters of reference denote corresponding parts in each of the drawings.

Referring to the drawings, A designates a rotary valve, preferably of crescent shape, with a flat under surface and provided with a pivot-pin *a*, on which it is adapted to be rotated. In the under side of the valve A is a recess or air-chamber B, and the upper surface of the valve is formed into a truncated cone and provided with a groove or dovetail *d*. This valve is set in a casing D, provided with an inlet-pipe E to supply the compressed air to the valve. A stem F, having a plate *g* and a lug *e* adapted to engage the groove *d* of the valve, projects upward through the casing, to which is secured a handle or lever G for operating the valve.

The valve-seat H is flat, corresponding in shape to the valve A, and has therein a socket or pivot-hole I, in which the pivot-pin *a* of the valve finds its bearing. Through the seat H are three holes or ports K L P. The port K is connected by the tube R with the brakes on the tender and engine. The port L is connected to the train service for operating the train-brakes, and the port P is the exhaust to the open air through the air-chamber.

In Fig. 8 I have shown a circular valve through which are cut the holes or ports T and V to correspond with the ports K and L in the valve-seat, and hereinafter it will appear that a valve thus constructed will operate in the same manner as the other valve with a portion cut away; but I prefer the valve first above mentioned.

The manner of operating my device is substantially as follows: Starting with the valve in the position in which the port K is open into the recess B and the port L open into the valve-chamber, in which position the brakes are released both on the train and the tender and engine, in order to set all the brakes by slow degrees, the engineer grasps the lever G and turns the valve, opening slightly the lower edge of the port K and at the same time the upper point of the port L. This action will allow the air to escape gradually from the valve through the port K directly to the engine and tender brakes and at the same time permit the pressure of the air to be gradually reduced from the train service through the port L into the chamber B and out of the exhaust-port P. A further rotation of the valve will entirely open the port K and L and will fully set the brakes on the tender and engine and at the same time release the pressure on the automatic train-brake pipe and fully set the brakes on the train. The valve will then be in the position shown in Fig. 6, with the air from the valve passing through port K directly to the engine and tender brake cylinders and releasing the pressure on the train-line through the port L into the recess B and out through the exhaust-port P. In emergency cases the engineer suddenly turns the valve and immediately the whole of the ports K and L are opened and the valve is brought into the position shown in Fig. 6 with the full pressure of the air on the tender and engine brakes and also an entire release of the air on the automatic train-pipe, which will instantly set the brakes on the entire train. When the engineer desires to release the brakes on the engine and tender and the train, he grasps the lever G and turns the valve in the opposite direction until the port K comes beneath the recess B and the air escapes through port K into the chamber B and out through the exhaust-port P. This movement rotates the valve past the port L, and opens into the valve-chamber, whereby the pressure from the air in the valve is forced into the train-service pipe and releases the train-brakes, and the valve will then be in the position shown in Fig. 7, with the brakes on the train and the tender and engine released. In the use of the valve shown in Fig. 8 the operator to set the brakes will simply bring the port T of the valve in conjunction with the port K in the valve-seat and the port L in the valve-seat to open into the chamber B, and to release the brakes he will reverse the movement of the valve and bring the port V of the valve in conjunction with the port L in the valve-seat, and at the same time open the port K of the valve-seat into the recess B, thence to exhaust. It will be observed that by this mode of construction the engineer has the control of the entire automatic air-brake system and of the engine and tender brakes and can operate them simultaneously by the same movement of a single lever.

My invention is particularly applicable to switch-engines, as the automatic air-brake used upon these engines is slow of operation, and in order to meet all of the demands and expedite the switching service there is placed upon this class of engines two valves, one for operating the automatic system and the other for operating the brakes with direct pressure of air. By my invention I do away with both of these valves and use only one valve, whereby I lose no time in switching whatever system is used upon the car to which the engine is coupled, as by my valve and its mode of operation it meets the demands of either the direct pressure of air or the automatic air-brake system, and I am enabled to switch cars of any system of brakes thereon without any loss of time.

Having now described my invention and its mode of operation, what I claim is—

In a device for operating air-brakes, a valve provided with a recess on its under side and set in a casing, a valve-seat having three ports, one to furnish air direct to operate the tender and engine brakes, a port to operate the automatic air-brakes of the train and the third for exhaust, and a lever for rotating the valve to utilize the ports simultaneously for operating the brakes on the tender and engine, and the automatic train-brakes.

In testimony whereof I have signed my name to this specification in the presence of two subscribing witnesses.

GEORGE GREGORY.

Witnesses:
M. M. CADY,
C. H. REYNOLDS.